UNITED STATES PATENT OFFICE.

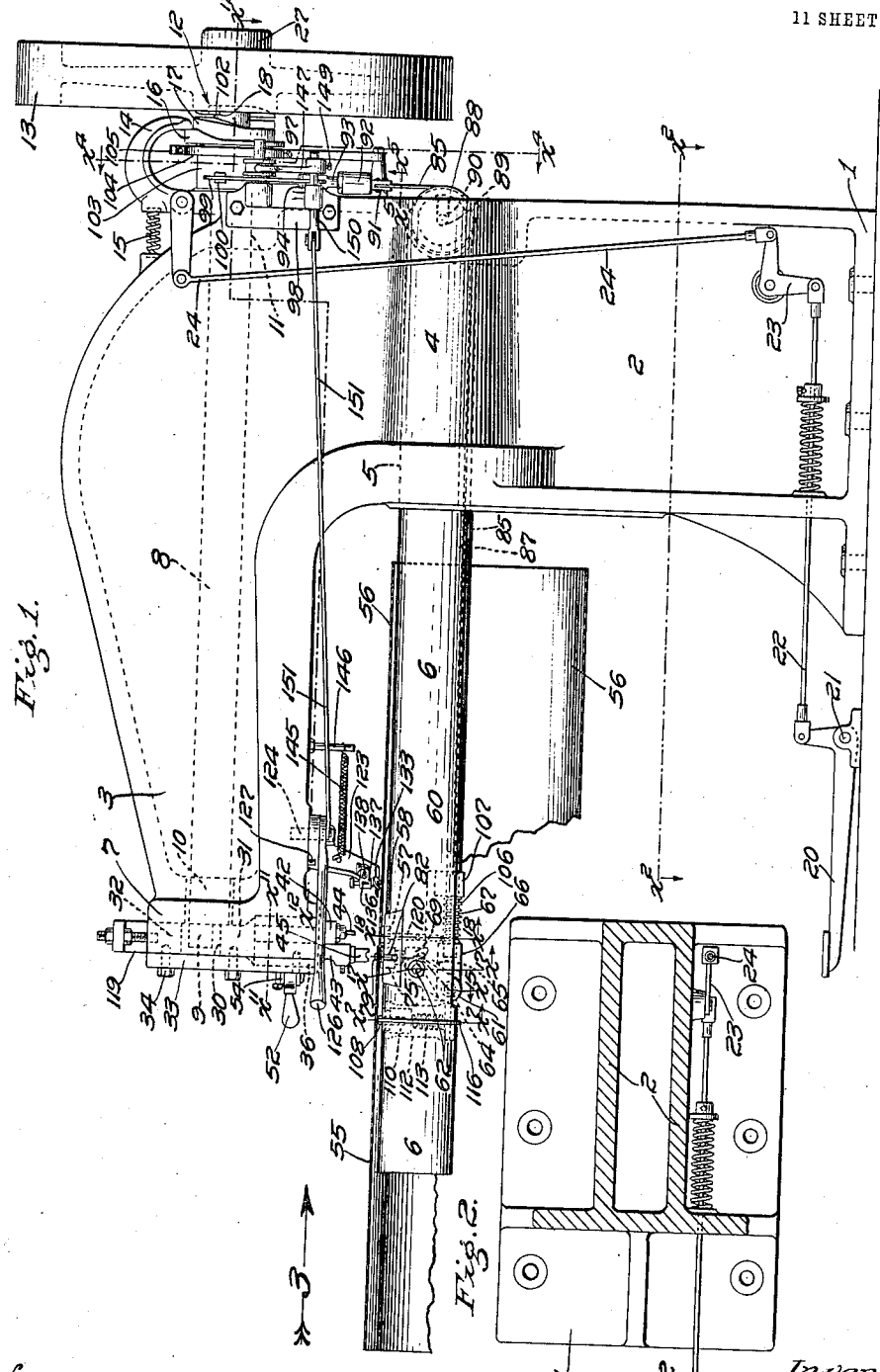

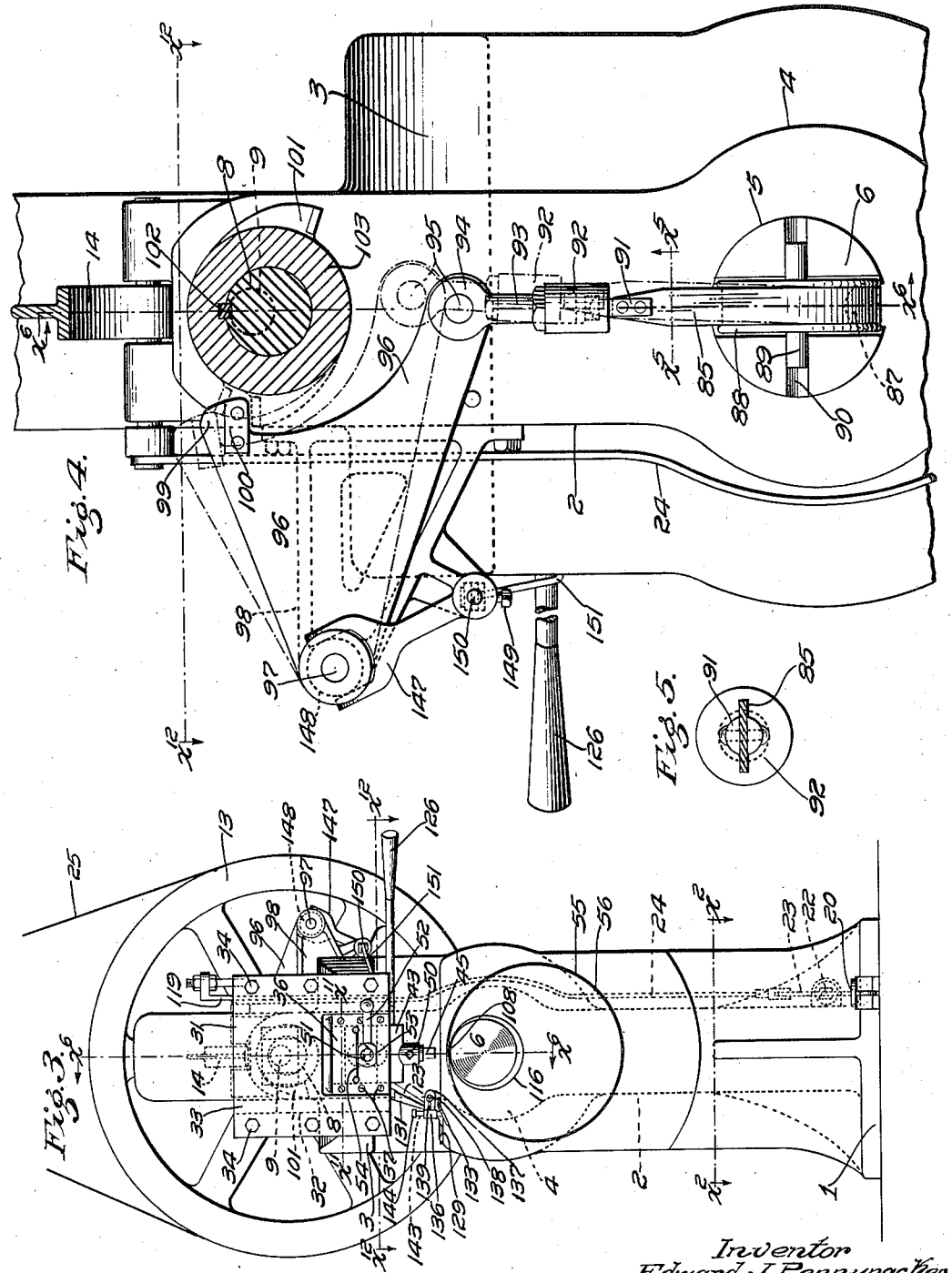

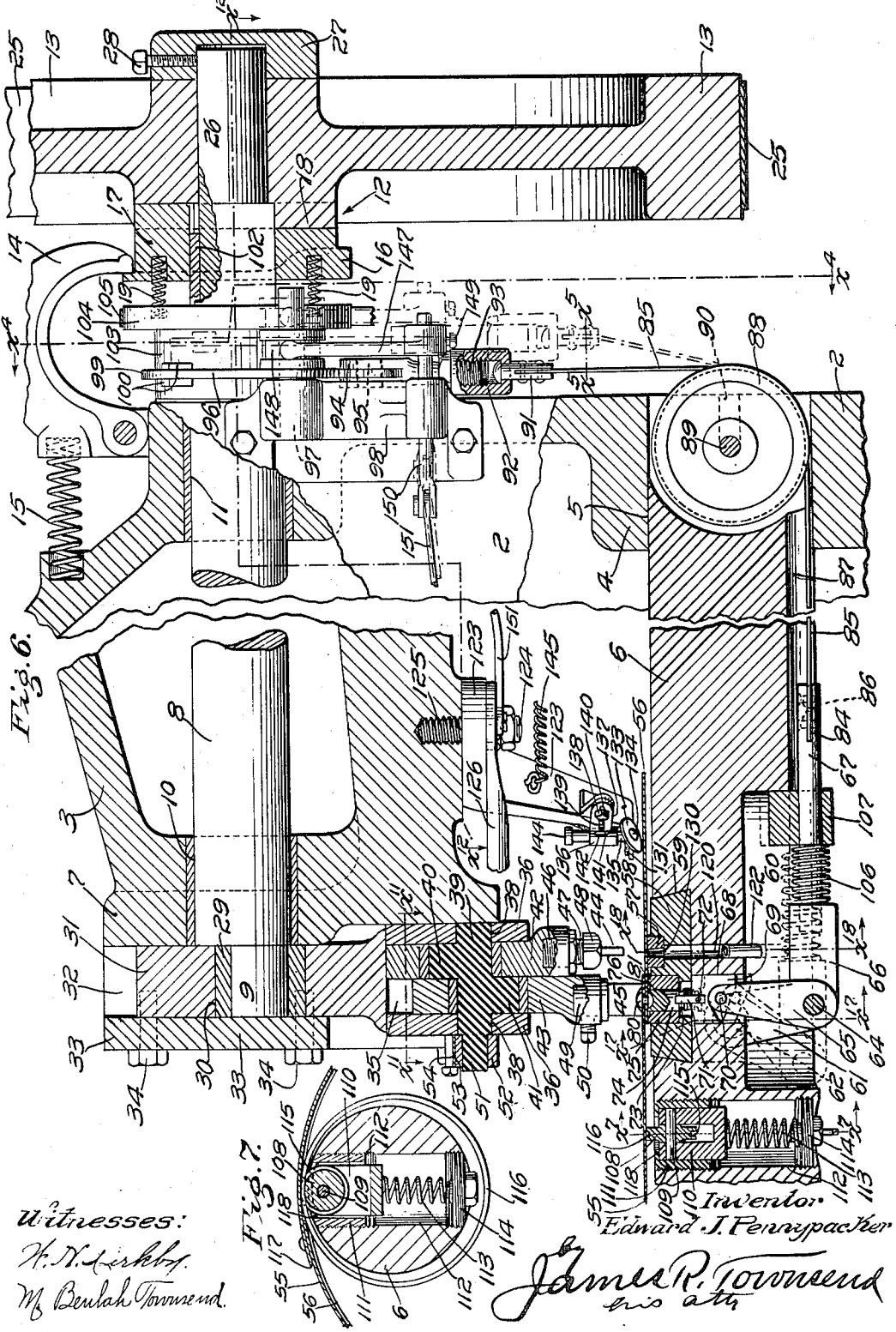

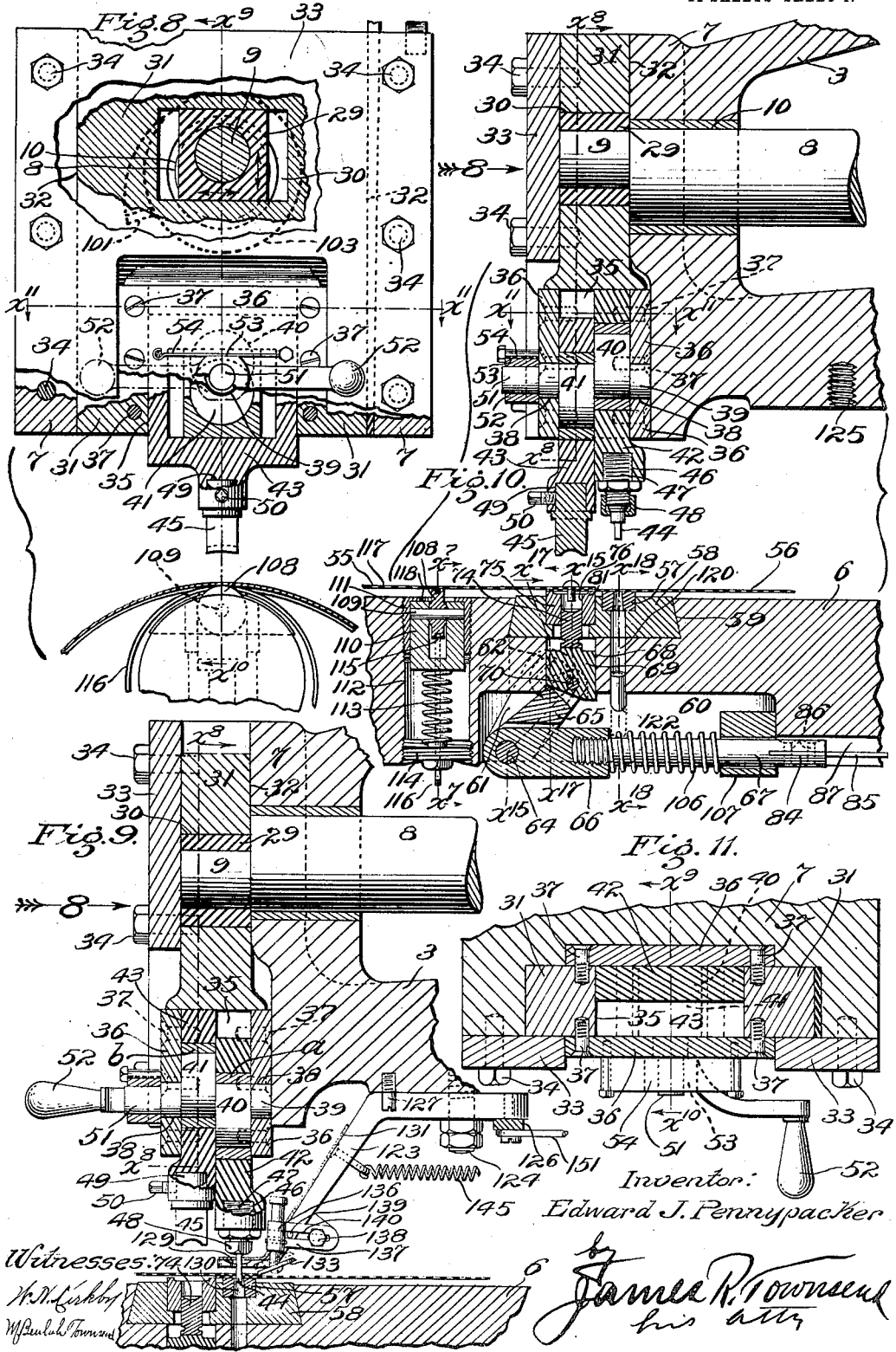

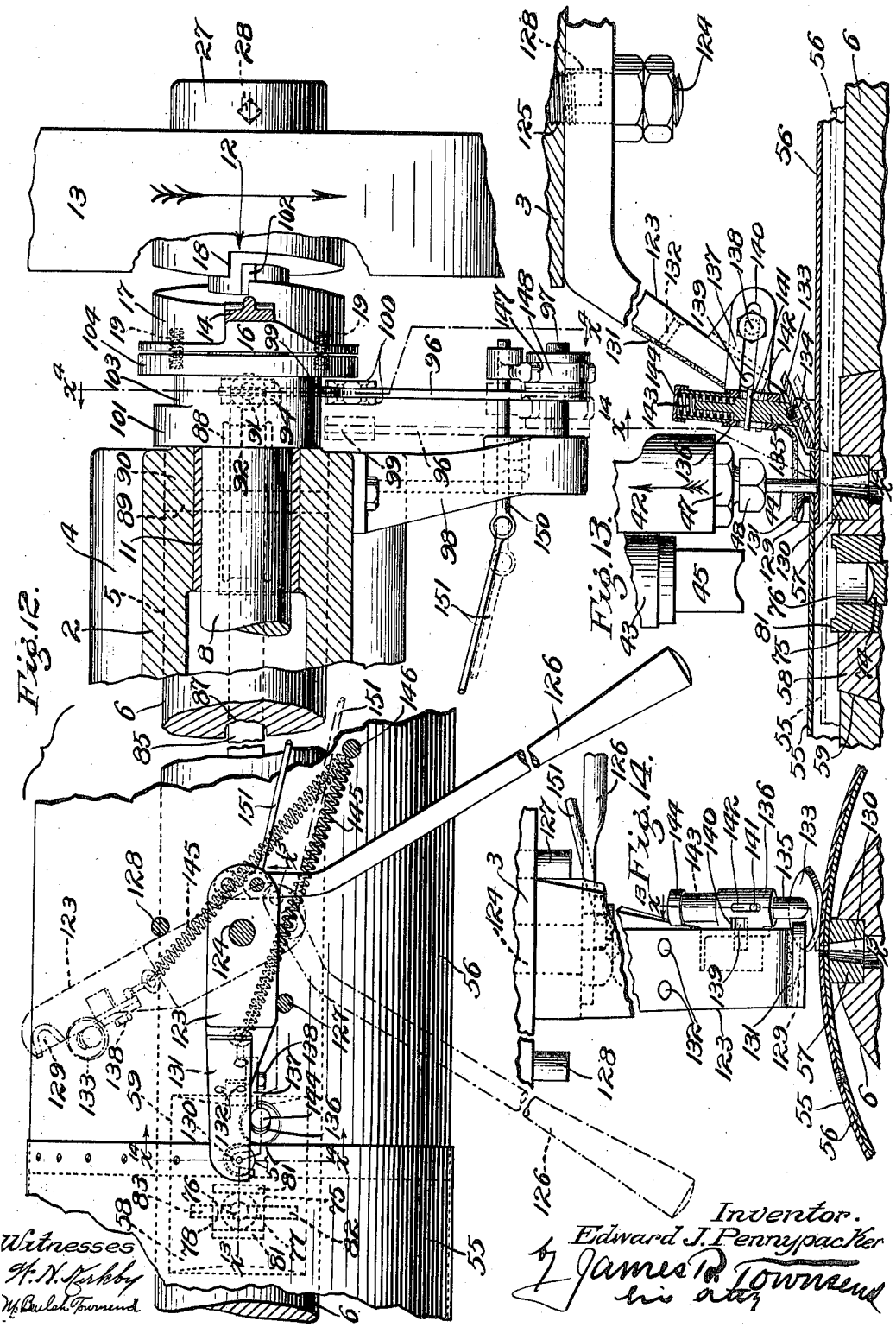

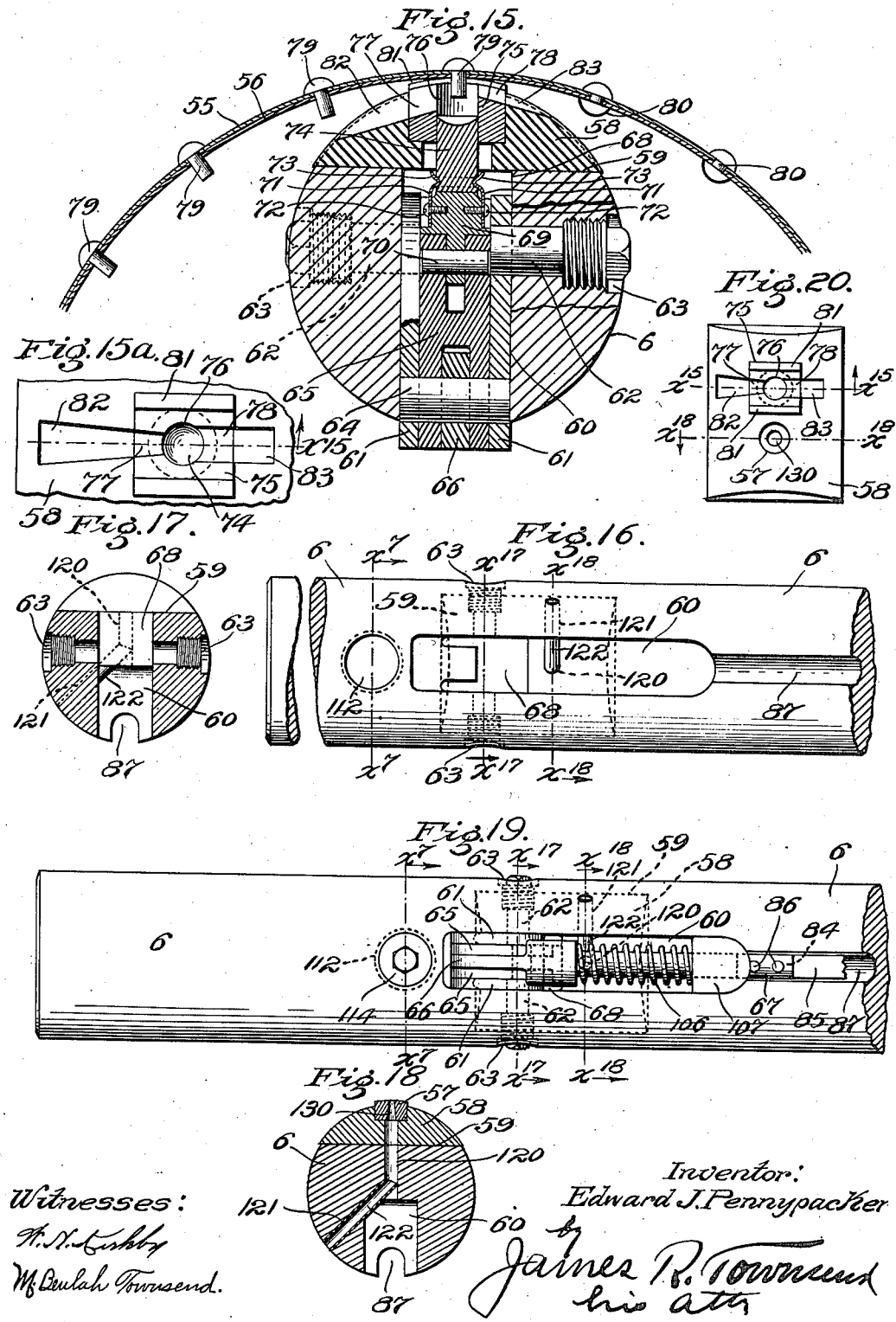

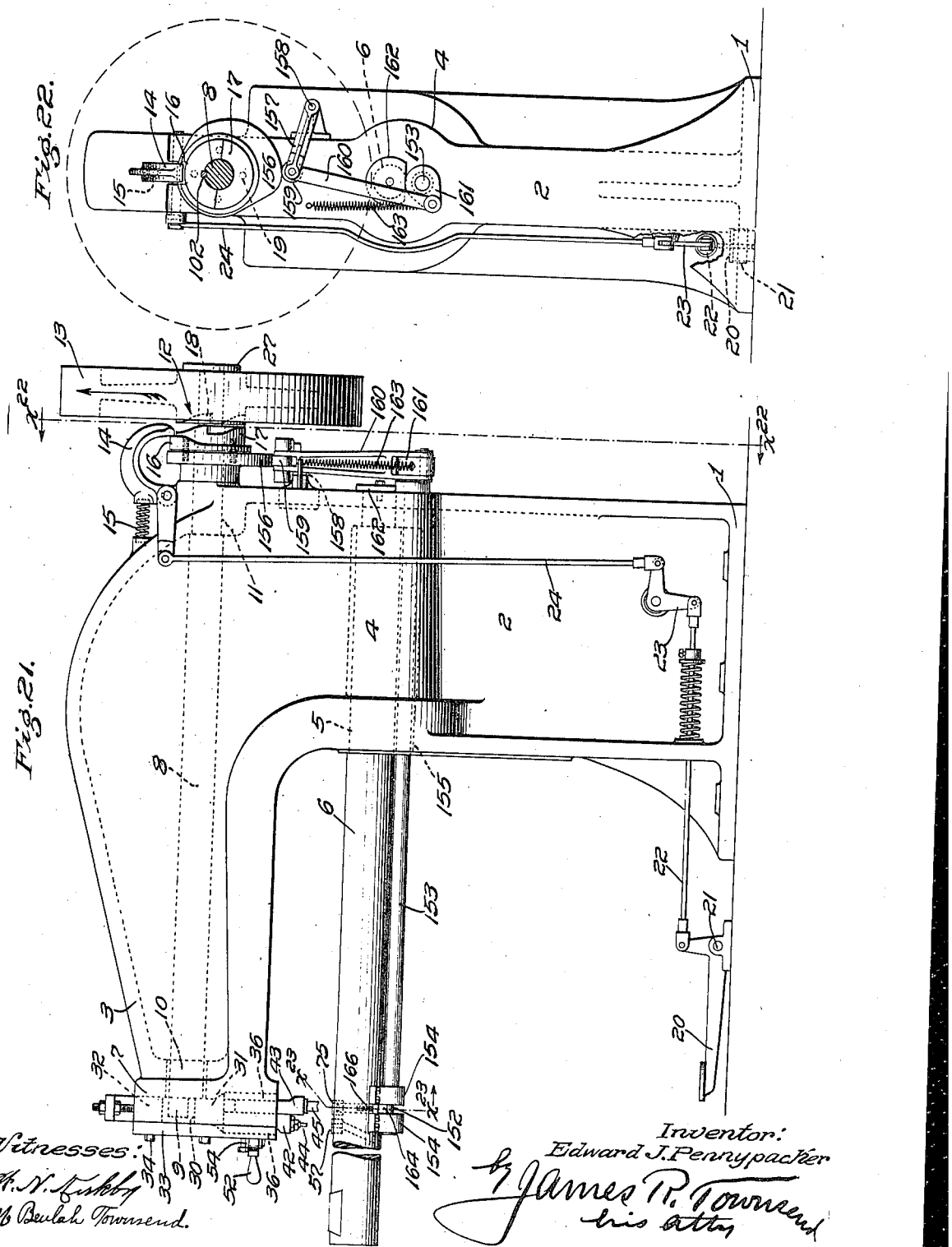

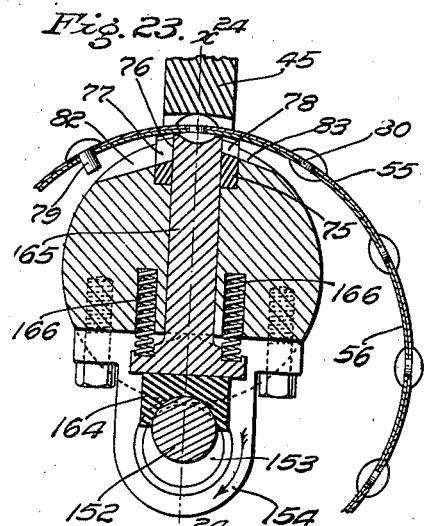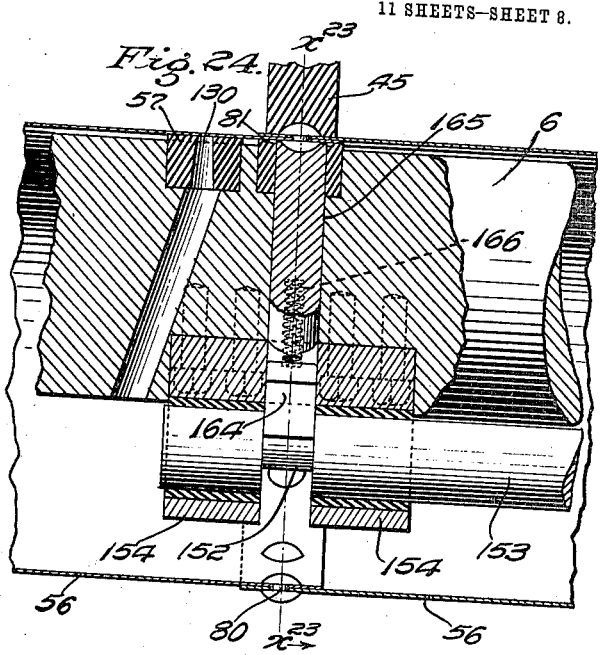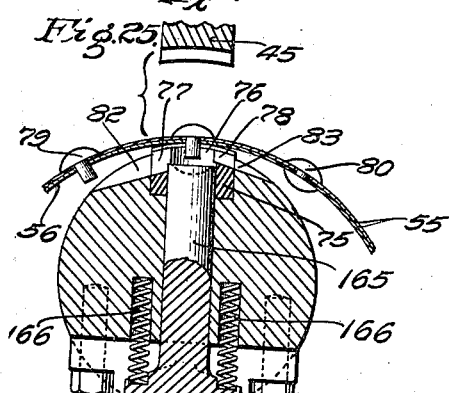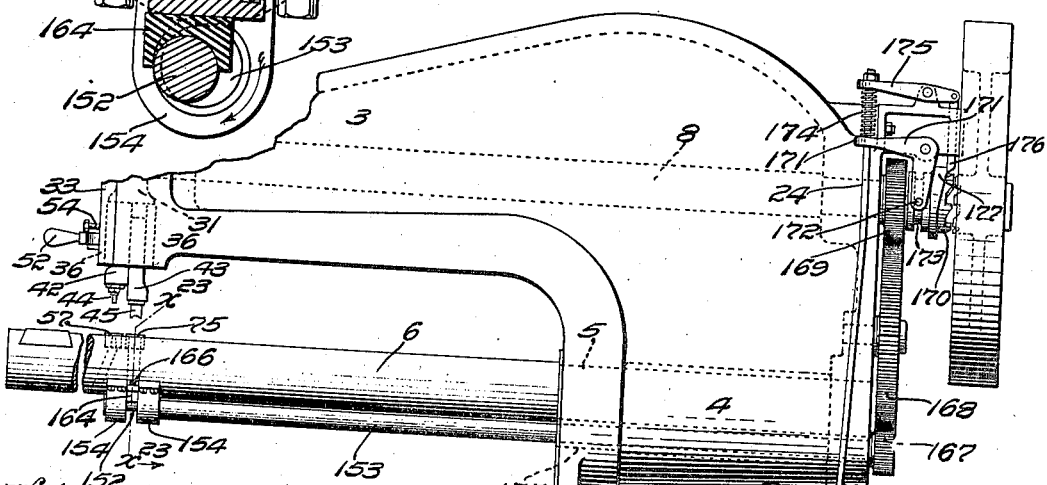

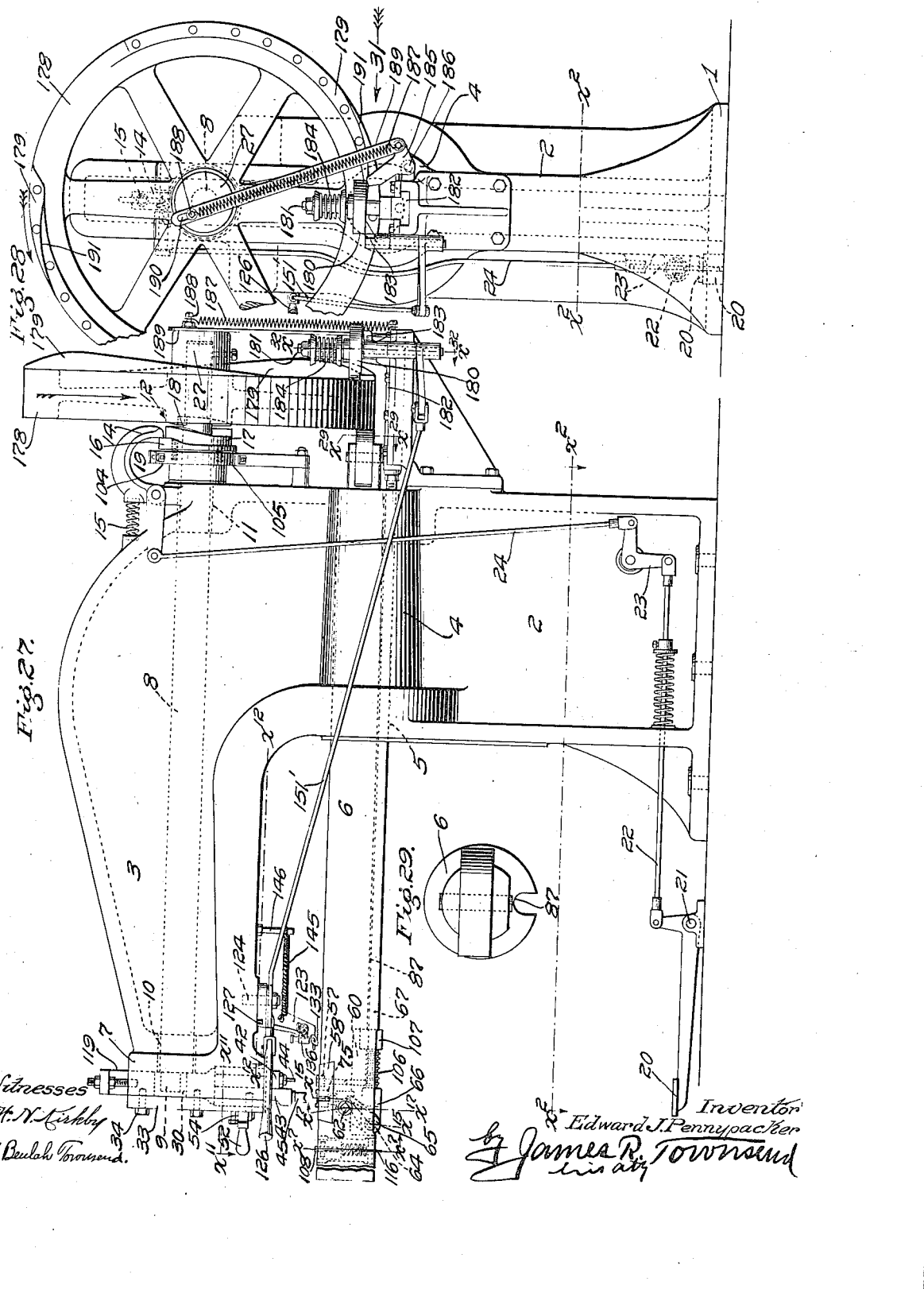

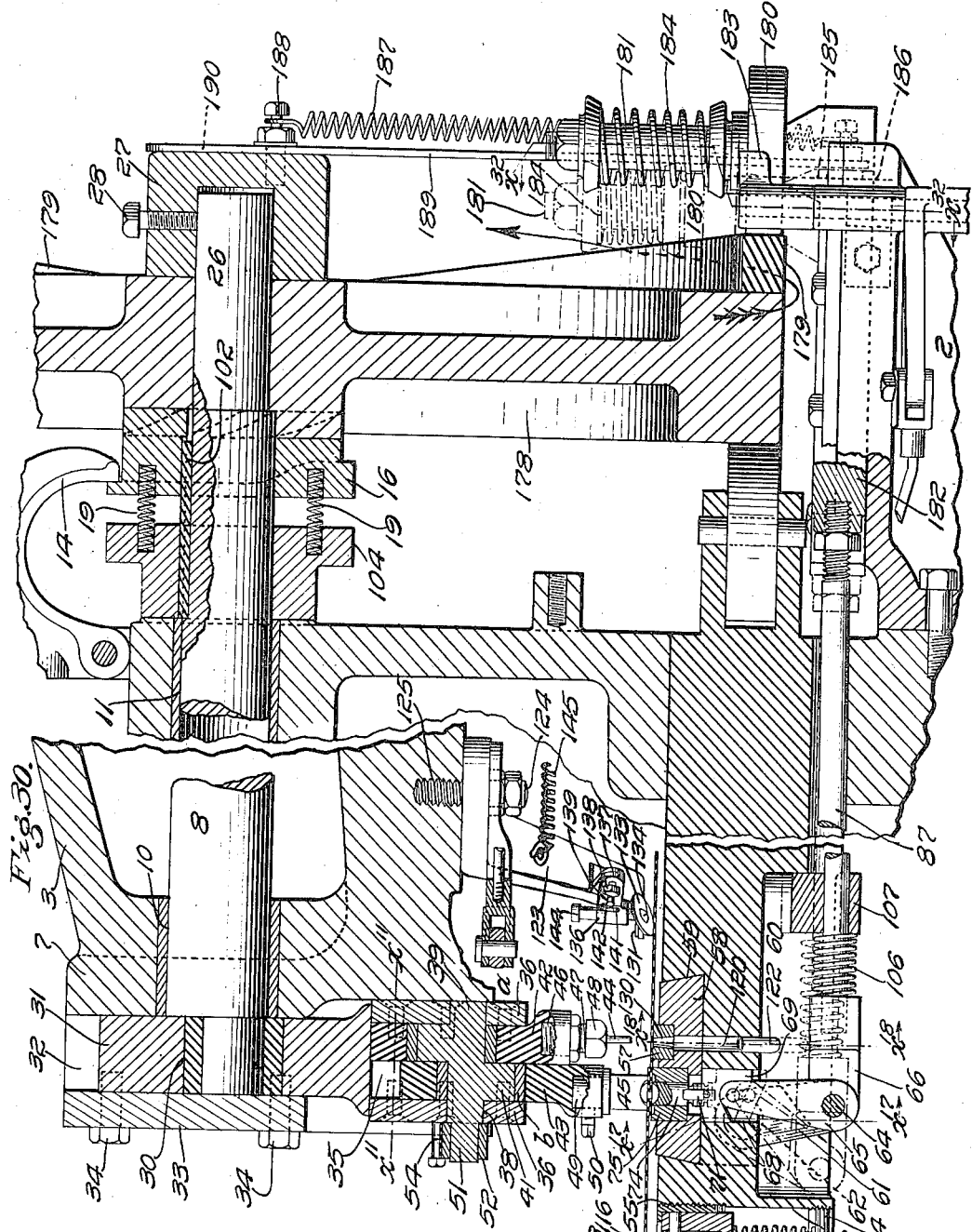

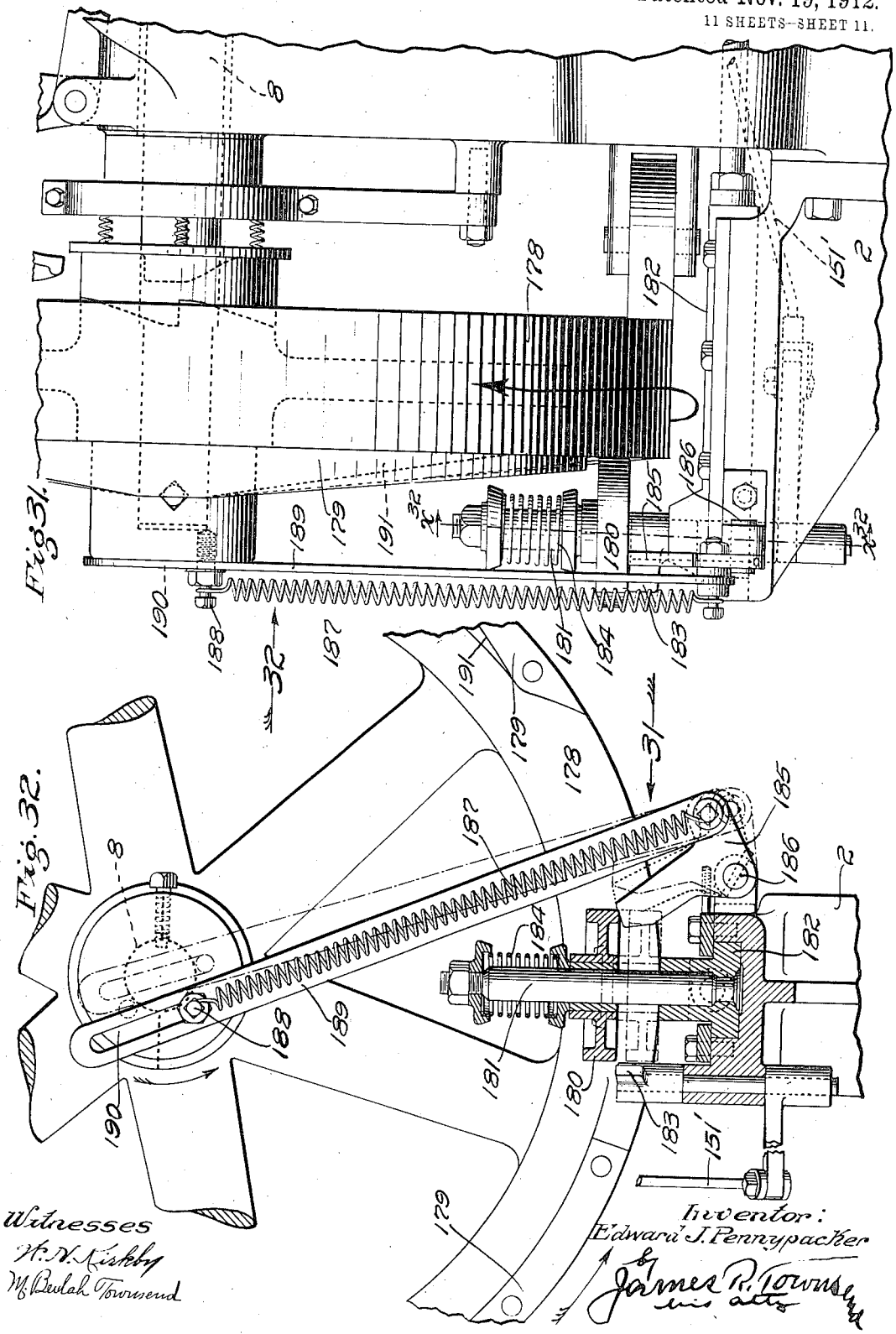

EDWARD J. PENNYPACKER, OF LOS ANGELES, CALIFORNIA, ASSIGNOR TO BAKER IRON WORKS, OF LOS ANGELES, CALIFORNIA, A CORPORATION OF CALIFORNIA.

RIVETING-MACHINE.

1,044,813. Specification of Letters Patent. Patented Nov. 19, 1912.

Application filed August 29, 1910. Serial No. 579,593.

*To all whom it may concern:*

Be it known that I, EDWARD J. PENNYPACKER, a citizen of the United States, residing at Los Angeles, in the county of Los Angeles and State of California, have invented a new and useful Riveting-Machine, of which the following is a specification.

This invention relates to machines which may be employed in the manufacture of sheet metal pipe, and is more particularly designed for riveting the round seams of cylindrical structures such as riveted pipe, steam boilers and the like.

The invention is mainly designed to facilitate the manufacture of riveted sheet metal pipe of ordinary diameters for use as oil-well and water-well casing and pressure water pipe. Such pipe has to sustain heavy pressures and strains both endwise and expansive, and it is necessary that the joints be strong and tight.

The manufacture of sheet metal pipe for sustaining heavy fluid pressure and other strains has heretofore been largely carried on by hand to insure perfect union of joints.

Certain objections obtain against hand work in the manufacture of sheet metal pipe of usual sizes, among which may be mentioned the necessity of sticking the rivets through the rivet holes from inside the pipe so that they may be set by the use of a hammer operated by the mechanic who necessarily has to stand on the outside of the pipe. This necessitates the use of short lengths of pipe so that the workman may reach the round seam from either end for the purpose of sticking the rivets. Moreover, the process is slow and tedious and machines have been devised to take the place of hand labor in the manufacture of riveted sheet metal pipe.

Various difficulties are encountered in the manufacture of riveted sheet metal pipe by machinery, among which may be mentioned the liability of the rivet becoming mashed in between the sheets, thus causing a fin or washer which will hold the sheets apart and cause the joint to leak; and in case a rivet hole is slightly too large, the rivet is liable to stand aslant and be crushed over sidewise and thus fail to fill the rivet hole. Furthermore, difficulty is experienced in holding the lap in correct shape while the rivet is being driven or set; also in stripping the pipe from the punch and in lubricating the punch.

It is necessary in the manufacture of riveting sheet metal structures that holes be provided for the rivets. In this riveting machine I combine as coördinate parts of the same organization so-called punching and riveting mechanism so that all the operations requisite to the riveting of the sheet edges together are performed by means of the machine in proper order.

The invention in part is applicable for punching and riveting any kind of seams formed between metal sheets where it is desired to hold the laps together while the rivet is being driven.

A feature of the invention is the provision of mechanism whereby the rivet head is held stationary and pressed against the outside of the pipe while the rivet is driven from inside the pipe, thus securing a tighter joint and overcoming many difficulties heretofore obtaining in the manufacture of pipe.

The invention also includes parts and combinations of parts particularly set forth in the subjoined detail description.

Objects of the invention are:—to overcome the above referred to difficulties, to hold the lap, rivet head and rivet in true position while the rivet is being driven, to do the riveting and the laying of the lap in one operation; to make a superior riveted pipe; to make provision whereby the view of the work is unobstructed by tools that are out of commission and whereby such tools will not interfere with the work either in riveting flat sheets or round pipe; and to provide means to lubricate the punch and to provide mechanism to strip the pipe from the punch.

The invention may be embodied in various forms.

The accompanying drawings illustrate the invention in some of the forms in which it may be embodied.

Figure 1 is a side elevation of a punching and riveting machine constructed in accordance with this invention in the form at present deemed best and with the parts ready for the riveting operation. Two pipe lengths are shown in section ready to be riveted together. Fig. 2 is a plan view in section on line $x^2$, Figs. 1 and 3. Fig. 3 is a front elevation of the machine with the parts in the same position as in Fig. 1. Parts at the rear of the machine are shown in dotted lines. Fig. 4 is a fragmental rear elevation from line $x^4$, Figs. 1, 6 and 12; the parts being in like position and on a larger scale than Figs. 1, 2 and 3. Fig. 5 is a section on line $x^5$, Figs. 1, 4 and 6, looking up. The scale is the same as in Fig. 4. Fig. 6 is an enlarged elevation mainly in longitudinal vertical section on line $x^6$, Figs. 3 and 4; the parts being shown at the close of the rivet setting operation. Fig. 7 is a cross section on line $x^7$, Figs. 1, 6, 10, 16 and 19. Fig. 8 is a broken front elevation partly in section on line $x^8$, Figs. 9 and 10. The parts are in the position shown in Fig. 10. Fig. 9 is a fragmental vertical axial section on line $x^9$—$x^{10}$, Figs. 8 and 11, showing the punching mechanism in operation. The punch, the lap layer and stripper are mainly shown unsectioned. Fig. 10 is an axial section on line $x^9$—$x^{10}$, Figs. 8 and 11, with a rivet inserted in a pipe and the lap laying mechanism in commission. Fig. 11 is a plan section on line $x^{11}$, Figs. 3, 6, 8 and 10, the lap laying mechanism being in commission. Fig. 12 is a broken fragmental plan partly in section on line $x^{12}$, Figs. 1, 3, 4 and 6, showing in solid lines the punch stripper and oiler and the lap guide in commission and parts of the rivet setting mechanism out of commission and the clutch disconnected. Dotted lines indicate the inactive position of the punch stripper, oiler and lap guide and the active position of the rivet setting mechanism. Fragments of two united lengths of pipe partly punched are shown on the stake. Figs. 4 to 12 inclusive are on one scale. Fig. 13 is a fragmental elevation on twice the scale of Fig. 12, partly in section on line $x^{13}$, Figs. 12 and 14, the parts being in the position shown in solid lines in Fig. 12, and in the act of stripping the pipe from the punch, which is shown on its up movement. The punch and the lap laying die are shown in elevation. Fig. 14 is an elevation in the scale of Fig. 13 and partly in cross section on line $x^{14}$, Figs. 12 and 13, showing the stripping mechanism in the solid line position of Figs. 12 and 13. Fig. 15 is a cross section of the stake on irregular plane partly indicated by line $x^{15}$, Figs. 1, 10, 15$^a$ and 20, showing a fragment of a partly riveted joint of pipe on the stake. The scale is that of Figs. 13 and 14. Fig. 15$^a$ is a fragmental plan detail of the anvil with combined lap-laying and rivet-holding die and rivet set in place. Fig. 16 is a fragmental broken view on the scale of Figs. 4 and 6 of the underside of the forward end of the stake dismantled showing the slot in which the device for operating the rivet set is mounted. Fig. 17 is a cross section of the stake on line $x^{17}$, Figs. 1, 6, 10, 16 and 19. Fig. 18 is a cross section of the stake on line $x^{18}$, Figs. 1, 6, 10, 16, 19 and 20. Fig. 19 is a fragmental bottom view of the forward end of the stake with the rivet setting device therein. Fig. 20 is a plan view of the lap-laying, riveting and punching anvil in the same scale as Fig. 16. Fig. 21 is a side elevation of a machine in which the invention is embodied in another form in which an eccentric is operated by the partial rotation and return of an eccentric shaft to set the rivet. Fig. 22 is a sectional elevation viewed from line $x^{22}$, Fig. 21 locking in the direction of the arrows. Fig. 23 is a cross section on line $x^{23}$, Figs. 21, 24, and 26, showing a joint of pipe on the stake and partly riveted, one of the rivets being shown as just driven; the rivet setting mechanism being at the point of maximum pressure. Fig. 24 is an axial section on line $x^{24}$, Fig. 23. Fig. 25 is a cross section analogous to that in Fig. 22 showing the position of parts at the beginning of a rivet setting stroke. Fig. 26 is a broken side elevation of a machine embodying this invention in another form, in which a rivet is driven at each complete rotation of an eccentric shaft operated through a train of gears, the shaft being of the same construction as that shown in Fig. 21. In the forms shown in Figs. 21 to 26, inclusive, the punch is in front of the lap-laying tool. In the other form the punch is behind such tool. Fig. 27 is a side elevation of a machine embodying the invention in a form in which a cam and fly-wheel operates the riveting mechanism. Fig. 28 is an end elevation of the form of machine shown in Fig. 27, broken to contract the view. Fig. 29 is an end elevation of the stake with thrust roller to support the cam wheel during action. Fig. 30 is a fragmental vertical longitudinal sectional detail of the mechanism in the form shown in Figs. 27, 28 and 29. Fig. 31 is an enlarged fragmental detail from the right of Fig. 28. Fig. 32 is a detail elevation partly in section on line $x^{32}$, Figs. 27 and 31.

The lines indicating the planes on which sections are taken in the different views are marked with the ordinals of the figures which show such sections respectively and in some of the views arrows are placed to indicate the direction of sight in other figures the ordinals of which accompany such arrows respectively.

The frame of the machine comprises a base 1, a standard 2 and an overhanging arm 3. The standard 2 is hollow and is provided with a bulge or boss 4 having a bore 5 in which the riveting stake 6 is fixed in the usual manner. The overhanging arm 3 is provided with a head 7, and a shaft 8 for operating an eccentric pin 9 in the head 7, is journaled in bearings 10 and 11 in the ends of the arm 3. Said shaft is detachably connected by a clutch 12 of common construction, with a loose pulley 13 which is also a fly-wheel.

The clutch is constructed for automatic action as will be understood by reference to Figs. 1, 6 and 12 where the clutch disengaging finger 14 is normally held by the spring 15 in position to engage the cam 16 on the slidable non-rotatable toothed clutch member 17 to withdraw such member from engagement with the clutch teeth 18 that are fixed on the fly-wheel 13.

The springs 19 normally hold the clutch member 17 in clutching position when the finger 14 is retracted as by a downward movement of the bell crank treadle 20 which is pivoted at 21 and operates the connections 22, 23, and 24 to withdraw the finger 14 from the clutch cam 16.

The wheel 13 is continuously driven by a belt 25 and rotates freely on the arbor 26 of the shaft 8, except when it is clutched to the shaft by the clutch 17. Said wheel 13 is held on the arbor by the cap 27 and set screw 28.

The eccentric pin 9 at the forward end of the shaft 8 is journaled in the bushing 29 that is mounted in the slot 30 in the tool carrier 31, which is mounted in a vertical guide-way 32 formed in the head 7 and closed by a head plate 33 fastened to the head by cap screws 34. When the finger 14 is retracted and the clutch member 17 is active, the shaft 8 is rotated to reciprocate the carrier 31 vertically. The carrier 31 is provided with a chamber 35, the front and back of which is closed by plates 36 fixed to the carrier body by screws 37 and provided with journal bearings 38 in which is journaled the carrier shifting shaft 39 having oppositely arranged eccentrics 40 and 41 on which, by means of bushings $a$, $b$, are mounted the eccentric blocks 42, 43, of the punch 44 and the combined lap-laying and riveting tool 45, respectively.

The eccentric block 42 is provided with a screw-threaded socket 46, into which is screwed the punch seat 47, and the punch 44 is removably attached to the punch seat by the sleeve 48 which is screwed onto the lower end of the punch seat. The eccentric block 43 is provided with a socket 49 in which the lap-laying tool 45 is secured by a set-screw 50. Said blocks are vertically movable in the carrier by the eccentric shaft 39 which terminates in an arbor 51 on which a crank 52 is fixed.

The eye of said crank is provided with flat faces 53 against which the crank holding spring 54 may engage to hold the crank in right and left horizontal positions as indicated by the solid and dotted lines in Fig. 8, to reversely move the eccentric blocks vertically in the carrier, thus simultaneously throwing the lap-laying and riveting tool into and the punch out of commission, when the crank is turned to the right, and vice versa, when the crank is turned to the left.

The throw of the eccentrics 40 and 41 is sufficient to move the bottom punch 44, in the one instance sufficiently above the level of the bottom of the lap-laying tool 45 to allow such tool to operate upon the outer pipe length 55, while the punch is free from the inner pipe length 56.

When it is desired to punch holes for the rivets, the crank 52 is turned to the left to depress the punching eccentric 40, and then the finger 14 is retracted thus allowing the clutch to engage the rotating fly wheel 13, thus to cause the shaft 8 to rotate as indicated in Fig. 9. By releasing the treadle and consequently the finger 14, the clutch is withdrawn from engagement; and the normal friction of the shaft 8 and its connected parts is sufficient to stop the shaft 8 while the wheel continues to revolve.

The cam 16 is located with relation to the eccentric pin 9 to disengage the clutch when the carrier 31 is in elevated position. To effect this result, in cases where the finger 14 is located above the shaft as shown in Figs. 1 and 6, said cam 16 is fixed practically on the same side of the shaft 8 with the eccentric pin 9. The finger 14, however, is not arbitrarily located as shown and when a change of its location is deemed desirable by the constructor a corresponding change in the cam 16 must be made in order that the shaft 8 will be timed to stop when the carrier 31 is elevated.

The stake 6 is provided, in axial alinement with the punch 44, with a punch die 57 set in the anvil 58 which is mounted in a dovetailed seat 59 extended transversely across the riveting stake 6.

When two pipe lengths are to be riveted together, they are first assembled and are then slipped over the stake; and the line at which the rivet holes are to be punched is brought beneath the punch 44; then the operator will place his foot upon the treadle 20, thus allowing the clutch 17 to engage the fly-wheel 13; and so long as the finger 14 is held out of engagement with the cam 16 the punch 44 will be operated once at each rotation of the fly-wheel. The operator will meanwhile turn the pipe between the strokes of the punch the distance required for the several punchings. By releasing the treadle, the finger 14 engages the cam 16, thus withdrawing the clutch from the fly-wheel, and the shaft 8 comes to rest with the cam 16 in clutch withdrawing position and the tool carrier elevated.

The stake 6 is provided in its under side with a cavity 60 in which is mounted a toggle device comprising two swinging links 61 pivoted to the stake by two toggle joint supporting pins 62 that are seated in transverse bores 63 in the stake 6, a thrust pintle 64 in the lower ends of the links, a thrust link 65 pivoted to the links by said pintle, and the toggle thrust block 66 into which the toggle connecting rod 67 is screwed. Above the cavity 60 is a vertical guide way 68 in which the riveting head 69 that is supported by the thrust link 65 and pivoted thereto by the riveting head pivot 70, is mounted to reciprocate vertically. The thrust link 65 is bifurcated at its ends to receive the knuckles of the toggle thrust block 66 and the riveting head, 69, and said riveting head 69 is provided with rivet set holding springs 71 that are fastened thereto by screws 72 and are provided with detents 73 to detachably engage the notched rivet set 74 which works vertically in the lap-laying die 75, that is a detachable part of the stake provided with a vertical way 76 above the guide-way 68 to guide the rivet set 74, and with transverse grooves 77 and 78 to admit the unset rivet 79 and allow the escape of the set rivet 80. Said lap-laying die is also provided at its top with two transverse front and back lap-laying ridges 81 to support the pipe against the final pressure of the lap-laying tool. Transverse grooves 82 and 83 in the top of the anvil 58 which is also a detachable part of the stake, register with the grooves 77 and 78 for the admission and escape of the rivet.

In the operation of driving or setting a rivet, the toggle thrust block 66 is moved backward, thus operating the toggle joint at the same time that the lap-laying tool is operated to compress the rivet head against the pipe sheets and said pipe sheets against the lap-laying die. It is important that the sheets be held together by the lap-laying tool and die and that there should be relative movement between the lap-laying device comprising said tool and die and the rivet set, so that while the sheets are firmly held together the rivet may be set by the rivet setting means independently of the force which holds the sheets together. At the same time it is important that the head of the rivet be held in contact with the top sheet, so that the rivet will not cant in the hole and also to avoid any distortion of the rivet in the operation of setting the same. It is therefore important that the rivet setting means shall operate independently of the sheet holding and rivet holding means so that the sheets may be firmly held together and the rivet head shall be firmly held on the sheets before and while the rivet setting tool acts. In order that this simultaneous operation of the lap-laying tool and the rivet set may be effected, the toggle device and its connecting rod are operably connected with mechanism operated by the shaft 8.

The mechanism is arranged to cause relative reciprocating movement between the rivet set and the lap-laying device. Such mechanism may be variously devised.

Referring to Figs. 1, 4, 6 and 12, the toggle rod 67 is provided with a slot 84 in which a steel ribbon 85 is fastened by rivets 86. Said ribbon is led along a groove 87 in the underside of the stake and through the standard 2 around a wheel 88 that is mounted on a pin 89 seated in a slot 90 let into the end of the stake 6. Said ribbon 85 is connected by a swivel stem 91 and a swivel sleeve 92 with a bifurcated knuckle-bolt 93 between the knuckles 94 of which is pivoted by knuckle-pin 95, the rocker 96 which is journaled by a shaft 97 to a bracket 98 that is fastened to the side of the standard 2. Said rocker is provided with a tappet 99 which may be reinforced by side pieces 100 for engagement with a cam 101 that is fixed to the shaft 8 by a key 102 which also serves as a spline upon which the clutch member 17 slides.

The hub 103 of the cam serves as a seat for the springs 19 which force the sliding clutch member 15 into engagement with the clutch teeth 12 when the finger 14 is retracted. The hub may also be provided with a brake wheel 104 to which a band brake 105 of ordinary construction and with usual operating devices may be applied if it is desired to employ a brake to insure the stoppage of the shaft 8 when the carrier 31 is elevated.

The toggle-returning spring 106 in the cavity 60 is interposed between the toggle thrust block 66 and a washer 107 that surrounds the toggle-rod 67 and engages the stake 6 to form a purchase for the toggle spring 106, so that when the rocker tappet escapes the cam 101 the toggle joint will be immediately withdrawn to normal non-riveting position, shown in solid lines in Fig. 10 and in dotted lines in Fig. 6.

The rocker 96 may be made of boiler iron and the reinforcements 100 may be pieces of tool steel riveted on opposite sides thereof at the tappet, as shown in Figs. 4 and 6.

The cam 101 is so arranged relative to the eccentric pin 9 and the tappet 99 that the upward thrust of the rivet set will be effected while the eccentric pin 9 is depressed. It is desirable that the movement of the rivet set be quick, and the cam 101 and the tappet 99 are preferably so arranged that the stroke of the rocker will begin and terminate within about one-twelfth revolution, more or less, of the power shaft 8.

In order that the pipe lengths to be riveted may be easily handled while on the stake, the stake is provided with a resiliently supported transverse anti-friction pipe-supporting wheel 108 mounted on an axle 109 that extends parallel with the axis of the stake and is carried in the slot of a slotted bearing block 110 which is guided by a vertical guide bushing 111 that is screwed into a vertical screw-threaded bore 112 in the stake. Said block is supported by a spring 113 carried by a seat 114 that is screwed into the bottom of the bore 112.

The wheel 108 is provided with a peripheral groove 115 in which the lap-lifting ring 116 which surrounds the stake 6 is hung, the purpose being to lift the inside edge of the longitudinal or straight-seam lap 117 as the pipe is turned around upon the stake. The wheel 108 and the ring 116 extend above the top of the stake and practically on a level with the ridges 81 of the lap-laying die. The bushing 111 is provided at its top with a shoulder 118 which overhangs the top of the bearing block 110.

The adjustable gib 119 enables the operator to prevent any looseness of the carrier 31 in its vertical way. The punch and lap-laying tool are thus held true.

The punch bore 120 (see Fig. 18) has a slanting extension 121 lined with a tube 122 to carry the punchings past the cavity 60 and to discharge them from the underside of the stake.

Referring now to Figs. 12, 13, 14; the pipe stripper and oiler comprises a lever 123 pivoted on a pin 124 fixed in a screw-threaded socket 125 in the underside of the overhanging arm 3. Said lever is provided with a handle 126 and has a limited horizontal movement between two stops 127, 128, that are fixed in the underside of the overhanging arm 3. The free end of the lever 123 is provided with a laterally open notch 129 adapted to register centrally with the bore 130 of the punching die 57, and said notch is covered by a wick 131 which is perforated to receive the punch and extends aslant upward along the upper face of the arm of the lever 123. Said wick may be fastened by a rivet 132 to said arm and in practice will be saturated with oil and the oil will feed by gravity to the lower flat perforated end of the wick, thus to oil the punch as it reciprocates in the operation of punching the pipe.

It is very desirable that the rivets of the round seam shall be at a determined distance from the end of the outer length of pipe and in order to insure the location of the rivet holes at the exact line required, a gage wheel 133 is mounted on a slanting axis 134 which may be formed by a screw screwed into the lower end of a spindle 135 which is movable in a barrel 136 that is inclined rearwardly at a slight angle from the vertical and is provided with a slotted arm 137, which is fastened to the lever 123 by a cap screw 138 and a guide pin 139. The cap screw 138 and the guide pin 139 extend through the slot 140 of the arm 137 and allow adjustment of the barrel and the wheel 133 lengthwise of the stake so as to vary the distance from the end of the lap at which the holes will be punched. The spindle 135 is provided with a stop in the form of a pin 141 that moves up and down in slots 142 in the barrel 136, and the spindle is pressed downward by a spring 143 held in the barrel by a cap 144 screwed onto the barrel. The wheel 133 is beveled on its upper face so as to enter the angle between the end of the outer length 55 of the pipe and the top side of the inner length 56. When the punch withdraws from a punched hole it lifts the pipe thus forcing the gage wheel 133 up against the pressure of the spring 143 and, since the barrel holds the spindle 135 rearwardly and upwardly aslant, the gage wheel withdraws from the pipe joint thus to prevent binding against the end of the outer length 55.

A lever-holding spring 145 is connected with the stripping lever 123 in front of the pivot 124 and with a stud 146 in the overhanging arm 3 at one side of the vertical axial plane of such arm in such a position that the spring will swing from side to side across the extended axis of the pivot 124 when the lever is swung from stop 127 to stop 128, and vice versa, so that when the lever is against a stop the spring will tend to hold it there.

It is desirable that the rivet-setting mechanism shall not be operated during the punching operation.

In order that the rivet-setting mechanism may be thrown out of commission automatically whenever the work on the riveting is being performed in the regular course, the rocker 96 is mounted to slide on its journal 97 so as to escape the cam 101. A forked shifting arm 147 engages the hub 148 which is fastened to the rocker 96. Said shifting arm 147 is fixed by a set screw 149 to a shifting rod 150 which is connected by a connecting rod 151 with the stripping lever 123 rearwardly of the pivot pin 124 of said lever at such a distance from said pin as to give the requisite throw to the shifting arm 147 to move the rocker 96 so as to bring its tappet 99 into the path of the cam 101. Whenever the stripper is thrown into commission the tappet 99 will be thrown out of the path of the cam 101 and when the stripper is thrown out of commission the tappet will be shifted into the path of said cam. The shifting rod 150 is slidingly supported in the bracket 98.

In the forms shown in Figs. 21, 22, 23, 24, 25 and 26 the rivet setting is effected by an eccentric 152 on shaft 153 that is mounted in journal bearings 154, 155, on the stake and standard. Motion may be transmitted to said shaft 153 by various means.

In the forms shown in Figs. 21 and 22 a cam 156 on the shaft 8 operates a rocker arm 157 that is pivoted by pin 158 to the standard 2, there being an anti-friction roller 159 on said rocker arm 157 to receive the thrust of the cam and transmit it through a connecting rod 160 and a crank 161 to the eccentric shaft 153. Said crank is mounted below the cap 162 that holds the stake 6 in the standard 2. A spring 163 holds the rocker and roller against the cam 156 and helps to return the crank and the eccentric to inactive position. When the cam actuates the crank the eccentric 152 moves the eccentric block 164 up against the riveting set 165 to set the rivet and when the cam 156 relieves the pressure on the roller 159, the springs 163 and 166 return the mechanism to inoperative position. The cam 156 is timed with relation to the eccentric 9 of the shaft 8 so that the rivet set will be forced upward simultaneously with the downward stroke of the lap-laying tool.

The clutch shown in Figs. 21 and 22 is the same as that shown in the other views.

In Fig. 26 the cam shaft 153 is rotated by gearing 167, 168 and 169 connected with the shaft 8; and the gearing is timed to effect the rivet-setting operation at the same time as the lap-laying tool is depressed.

In Fig. 26 the mechanism for shifting the clutch member 170 consists of the bell crank 171 pivoted to the standard and provided with a pin 172 that engages in annular groove 173 to shift the member 170; and the connecting rod 24 operates the bell crank 171 to shift the clutch member 170 into engagement, a spring 174 being interposed between a latch lever 175 and the bell crank lever 171, so that the shifting is effected without jar when said rod 24 acts upon the latch-lever 175 to withdraw the latch 176 from the path of the cam 177, thus allowing the member 170 to shift. When the connecting rod 24 is released the spring 174 returns the latch 176 into the path of said cam 177 which thereby effects the shifting of the clutch member 170 upon the first revolution thereafter of said member thus disconnecting the clutch in the same manner heretofore described with relation to clutch member 17.

It is understood that the same form of clutch may be used in any of the different forms of riveters.

In the forms shown in Figs. 27, 28, 29, 30, 31 and 32 the fly-wheel 178 is mounted loose on the shaft 8 as in the other views and is provided with cams 179 that act upon the anti-friction roller 180 that is connected by the pin 181 with a sliding bar 182 mounted to slide longitudinally in the stake 6 to operate the toggle-joint mechanism hereinbefore described. The riveting roller 180 is shiftable vertically on the pin 181 and the lock 183 is provided to enter beneath the anti-friction wheel 180 to support it against the pressure of the spring 184 and to hold it out of the path of the cams 179 of the fly-wheel 178. Said lock is controlled by the stripper lever 123 through the connecting rod 151', so that whenever the stripper is thrown into its active position shown in solid lines in Fig. 12, the lock will be shifted by the connecting rod 151' to support the roller 180 and lock it out of commission so that the rivet setting mechanism will not be actuated. When the lever 123 is moved to throw the stripper out of commission, the lock 183 is moved to release the wheel 180 so that if it is otherwise unsupported it will move down into the path of the cams 179 shown in Fig. 30. The latch 185 is pivoted to the frame 2 by the pin 186 and is normally held in latching position by a spring 187 which is connected with a crank pin 188 on the fly-wheel 178. Said latch is also operated by the slotted latch rod 189, the slot 190 of which engages the crank pin 188, and said crank is so positioned relative to the latch that on its down stroke it will remove the latch from latching position, thus allowing the wheel 180 to drop into active position unless the lock 183 is in locking position. Consequently when the lock 183 is out of locking position the movement of the pin 188 through the lower arc of its path will release the roller 180, so that as the fly-wheel 178 continues to rotate the slide 182 will be operated to actuate the toggle-joint mechanism to effect the riveting. Return shoulders 191 upon each cam 179 gradually move the riveting wheel 180 back to normal position where it is automatically latched by the latch 185 out of the way of the cams 179.

In Figs. 23, 24 and 25 the anvil is omitted and the punch and lap-laying dies are seated directly in the stake and it is understood that various forms of anvil and stake may be employed within the judgment of the constructor.

It is thus seen that in practical operation the tools on the tool carrier are shiftable relative to each other in the same line in which they move in all operations; all the movements of said tools being always directly toward and from the stake and never in a line transverse to the stake; that the tools on the stake, with the exception of the rivet set, are stationary; that the rivet set moves axially in the same plane as the tools on the carrier, and that there is no liability of disalinement of any of the tools.

It is understood that the anvil, the lap-laying die and the punching die are all practical parts of the stake and that they and the other punching and riveting tools may be variously constructed to meet the requirements of various jobs.

In practical operation the workman will first turn the crank 52 to shift the tool carrier 31 into position and will shift the gaging and stripping lever 123 into commission, shown in solid lines in Fig. 12, and the rocker 96 out of alinement with its cam 101.

If two lengths of pipe are to be riveted together they are assembled by hand and are then placed upon the stake 6 and are brought into position with the lap or joint between the pipe length on the punching die 57. Then the operator by depressing the treadle 20 will engage the clutch 12, thus causing the shaft to rotate thereby depressing the tool carrier 31 and thus operating the punch through one revolution of the shaft 8 whereupon the clutch automatically releases the shaft 8 and comes to a stand with its eccentric pin 9 at the top, the operator will then turn the pipe which is resting on the roller 108, the loose ring 116, the punching die 57 and lap layer 75 to bring the pipe into position for another operation of the punch 44 and then the operation just described is repeated until all of the holes are punched. Then the operator will turn the crank 52 to shift the tool carriers in the reciprocating head, to raise the punch 44 and lower the external lap layer 45, and will then shift the lever 123 out of commission, as in dotted lines in Fig. 12, the operator will with the right hand, place a number of rivets in the holes which are nearest to him at the top of the pipe and will turn the pipe to bring the first of said rivets centrally above the riveting die and will then depress the foot lever 20, thus releasing the clutch finger 14 and engaging the clutch. Thereupon the shaft 8 is rotated by the rotating fly-wheel, and the riveting tools carried in the stake and arm will coact to set the rivet; the tool 45 also laying the lap with great pressure.

By operating the upper riveting tool by means of an eccentric and the lower riveting tool by a cam, the upper tool remains in position for a time definitely longer than is necessary for the stroke effected by the lower tool; and furthermore, the stroke of the lower tool is sudden so as to drive the rivet practically instantaneously and with great force, thus to set the same most effectively.

I claim:—

1. In a pipe riveting machine, the combination with a stake, of means outside the stake to lay the lap and hold the rivet, means inside the stake to set the rivet so held, and mechanism to operate said means conjointly.

2. In a pipe riveting machine the combination with means for holding together sheets to be riveted and for holding the rivet heads in contact with one of said sheets, of rivet-setting means, and means for causing relative reciprocation between said sheet and rivet-holding means and said rivet-setting means.

3. A riveting machine comprising a stake, means above the stake to lay the lap and hold the rivet, and means within the stake to set the rivet so held.

4. The combination with a riveting stake, of a lap laying die carried by the stake, a lap-laying tool outside the stake to cooperate with the lap-laying die, a rivet set movable in the lap laying die, and means to move the rivet-set toward and from the lap laying tool.

5. The combination of two coöperating lap laying tools, a rivet-set in one of the lap laying tools, and means to operate said rivet-set toward the other lap laying tool.

6. The combination with a stake provided with a lap laying tool; of a lap laying tool to coöperate with the lap laying tool of the stake, and a rivet-set in the stake to coöperate with the second lap laying tool to drive the rivet held by said second lap laying tool.

7. In a riveting machine, a lap laying die provided with a vertical way and provided on opposite sides of said way with parallel ridges and between said ridges with grooves leading to and from said way.

8. In a riveting machine, a lap laying die provided with a vertical way and provided on opposite sides of said way with parallel ridges and between said ridges with grooves; one of said grooves being tapered toward the way to admit the stem of a rivet to the way and the other groove being adapted to allow the exit of the set rivet from said way.

9. The combination with a stake of a combined lap laying and riveting die provided with a vertical way and provided with ridges on opposite sides of the way and with grooves between the ridges, leading to and from the way; a rivet set in the way; a lap laying tool; and means for simultaneously moving the lap laying tool and the set toward each other to lay the lap and set the rivet.

10. In a riveting machine, a stake provided with a vertical way and with transverse slots leading to and from said way, a rivet set in the stake, means to move said set in the way and a lap-laying and riveting tool coöperating with the set to set the rivet.

11. The combination with a stake having a plurality of tools arranged along the stake, of a reciprocating head, independently operating tool carriers carried by said head and arrranged along the stake above the same, means for relatively adjusting said tool carriers for the purpose of moving one of the same into and another out of commission and vice versa, and tools in said carriers respectively alined with and arranged to coöperate with the tools on the stake respectively.

12. In a riveting machine a vertically reciprocating carrier, a shaft journaled in the carrier and provided with variously arranged eccentrics, eccentric blocks vertically movable in the carrier and mounted on the eccentrics respectively, punching and riveting tools carried by the blocks respectively, and means to turn the shaft to bring one tool into and the other out of commission and vice versa.

13. In a riveting machine two eccentric blocks each provided with a socket, a punch and a rivet set in said sockets respectively, eccentrics arranged to move said blocks in reverse directions, and means to simultaneously reciprocate said blocks together.

14. In a riveting machine, a head provided with a guide-way, a carrier in said guide-way, said carrier being provided with a chamber, plates fixed to the carrier at the front and back and provided with journal bearings, a shaft having two eccentrics and journaled in said plates, eccentric blocks mounted on the eccentrics within said chamber and between said plates, tools on said eccentric blocks, tools to coöperate with said tools and means to turn the shaft.

15. In a riveting machine, a vertically reciprocating carrier, reversely movable blocks in said carrier, punching and riveting tools on said blocks respectively, means to reciprocate the carrier and means to shift the blocks to bring one into and the other out of commission, and vice versa.

16. In a riveting machine, punching and riveting tools, means to reciprocate said tools in one plane and means to reversely shift said tools in the same plane.

17. The combination with a stake having in one end intersecting vertical and horizontal slots, the vertical slot being of greater length than the horizontal slot, said stake also having in its under side a longitudinal groove communicating with the vertical slot, and a cavity communicating with the groove and a vertical way extending up from the cavity; of a pin in the horizontal slot, a wheel on the pin and in the vertical slot, a rivet-set in the way, mechanism in the cavity to operate the rivet-set, a spring to return the rivet-set to normal position, a ribbon led around the wheel and connected to operate said mechanism against the force of the spring, and means to draw the ribbon over the wheel against the force of the spring.

18. The combination with a stake having in one end intersecting vertical and horizontal slots, the vertical slot being of greater length than the horizontal slot, said stake also having in its under side a longitudinal groove communicating with the vertical slot, and a cavity communicating with the groove and a vertical way extending up from the cavity; of a pin in the horizontal slot, a wheel on the pin and in the vertical slot, a rivet set in the way, mechanism in the cavity to operate the set, a spring to return the set to normal position, a ribbon led around the wheel and connected to operate said mechanism against the force of the spring, a rocker above the wheel and a cam to operate the rocker, said ribbon being connected with the rocker.

19. The combination with a stake having in one end intersecting vertical and horizontal slots, the vertical slot being of greater depth than the horizontal slot, said stake also having in its under side a longitudinal groove communicating with the vertical slot, a cavity communicating with the groove and a vertical way extending up from the cavity; of a pin in the horizontal slot, a wheel on the pin and in the vertical slot, a rivet set in the way, mechanism in the cavity to operate the set, a spring to return the set to normal position, a ribbon led around the wheel and connected to operate said mechanism against the force of the spring, a shaft, a rocker above the wheel, a cam on the shaft to operate the rocker, said ribbon being connected with the rocker; a riveting tool above the stake to coöperate with the rivet set, and mechanism operated by the shaft to actuate the riveting tool.

20. A riveting stake provided with a transverse way, a bushing screwed into said way at the upper side of the stake, a plug screwed into the way at the underside of the stake, a head in said bushing, a roller carried by the head and a spring between the head and the adjusting plug to support said head and project the roller above the stake.

21. In a riveting machine a stake having a vertical way, and a rivet set in the way, said stake being also provided with two transverse grooves on its upper side communicating with said way, one of said grooves being narrowed from its outer end toward the way to shift the rivet stem to alinement with the center of the way as the sheets to be riveted are moved for that purpose.

22. In a riveting machine, the combination with a stake having a vertical way therein, of toggle links swung from the stake, a thrust pintle carried by said links, a thrust link carried by the thrust pintle, a riveting head pivoted to the thrust link, a lap laying die provided with a way, a rivet set mounted on the riveting head and operating in the lap laying die, a rotary shaft, means to rotate the shaft, means to communicate motion from the shaft to the thrust pintle to swing the toggle links to operate the rivet set, and means operatable by the rotary shaft to hold a rivet head in opposition to the rivet set.

23. A stake provided with a chamber and a vertical guideway and with two alined transverse holes outer portions of which are threaded, pins screwed into the holes and provided with pivot portions that extend into the chamber; a rivet set vertically movable in said way, and toggle joint mechanism pivoted on the pins and connected to operate said set.

24. In a riveting machine the combination with a stake, of a rivet set vertically movable in the stake, toggle joint mechanism to move the rivet set, a riveting tool for holding the head of a rivet in opposition to the rivet set, resilient means to normally retract the toggle joint and its rivet set, a pulley, a shaft to transmit motion to operate the riveting tool, and means operably connecting the shaft and the toggle joint mechanism to operate the rivet set and riveting tool in conjunction with each other, said connecting means including a flexible connection led around the pulley.

25. In a riveting machine the combination with a stake, of a riveting tool outside the stake, a rivet set in the stake, a pulley at the rear end of the stake, mechanism to reciprocate the tool, a shaft to operate such mechanism, a cam on the shaft, a rocker operatable by the cam, mechanism to operate the rivet set, resilient means to retract the rivet set operating mechanism, and a strap around the pulley and connecting the rivet set operating mechanism with the rocker arm.

26. In a riveting machine the combination with a stake, of a riveting tool outside the stake, a rivet set in the stake, a pulley at the rear end of the stake, mechanism to reciprocate the tool, a shaft to operate such mechanism, a cam on the shaft, a rocker operatable by the cam, means to shift the rocker into and out of the path of the cam, mechanism to operate the rivet set, resilient means to retract the rivet set operating mechanism, and a strap operably connecting the rivet set operating mechanism with the rocker arm.

27. In a riveting machine the combination with a stake, of a riveting tool outside the stake, a rivet set in the stake, a pulley at the rear end of the stake, mechanism to reciprocate the tool, a shaft to operate such mechanism, a cam on the shaft, a rocker operatable by the cam, mechanism to operate the rivet set, resilient means to retract the rivet set operating mechanism, a strap and adjustable means unitedly connecting the rivet set operating mechanism with the rocker arm.

28. The combination with a stake and co-operating rivet-setting mechanism inside and outside the stake of a shaft to operate the outside rivet-setting mechanism, a cam on the shaft, a clutch member on the shaft, a rotary driving element having a clutch member for engagement with the clutch member on the shaft, a rocker shiftable into and out of position for engagement with the cam, and means operably connecting the rocker arm with the rivet-setting mechanism in the stake.

29. In a riveting machine the combination of a stake, a grooved wheel mounted in the stake and projecting above the top of the stake and having its axis parallel with that of the stake, and a ring in the groove to lift the lap of a pipe to be riveted.

30. A stake provided with a vertical screw-threaded bore, a slotted bearing block vertically movable in the bore, a spring to support the bearing block, and a wheel carried by the bearing block on an axis that extends parallel with the stake, said spring being arranged to normally hold the wheel in position to project above the top of the stake.

31. A stake provided with a vertical screw-threaded bore, a slotted bearing block vertically movable in the bore, a spring to support the bearing block, a wheel carried by the bearing block on an axis that extends parallel with the stake, said spring being arranged to normally hold the wheel in position to project above the top of the stake, and means to adjust the spring.

32. A stake provided with a vertical screw-threaded bore, a slotted bearing block vertically movable in the bore, a wheel carried by the bearing block on an axis that extends parallel with the stake, a plug screwed into the bore and a spring mounted on the plug to support the bearing block to hold the wheel in position to project above the top of the stake.

33. A riveting stake provided with a vertical bore screw-threaded at the top and bottom, a plug screwed in the bottom of the bore, a spring on the plug, a bushing in the upper end of the bore, a bearing block in the bushing and on the spring, stops carried by the bearing block to engage the bushing and a wheel mounted in the bearing block on an axis that is parallel to the axis of the stake.

34. The combination with a riveting stake of a loose ring around the stake to lift the straight seam lap of pipe to be riveted.

In testimony whereof, I have hereunto set my hand at Los Angeles, California, this 23d day of August 1910.

EDWARD J. PENNYPACKER.

In presence of—
   JAMES R. TOWNSEND,
   OLIVE DIFFENDERFER.